(12) United States Patent
Eisenhardt et al.

(10) Patent No.: US 8,647,417 B2
(45) Date of Patent: Feb. 11, 2014

(54) VACUUM INSULATION UNITS COMPRISING GETTER MATERIALS

(75) Inventors: Andrea Eisenhardt, Vechta (DE); Joerg Krogmann, Lohne (DE); Emi Leung, Mannheim (DE); Ulrich Mueller, Neustadt (DE); Christoph Kiener, Weisenheim am Sand (DE)

(73) Assignee: BASF SE, Ludwigshafen (DE)

( * ) Notice: Subject to any disclaimer, the term of this patent is extended or adjusted under 35 U.S.C. 154(b) by 258 days.

(21) Appl. No.: 13/144,234

(22) PCT Filed: Jan. 12, 2010

(86) PCT No.: PCT/EP2010/050268
§ 371 (c)(1),
(2), (4) Date: Jul. 12, 2011

(87) PCT Pub. No.: WO2010/081797
PCT Pub. Date: Jul. 22, 2010

(65) Prior Publication Data
US 2011/0265654 A1 Nov. 3, 2011

(30) Foreign Application Priority Data
Jan. 14, 2009 (EP) .................................. 09150521

(51) Int. Cl.
*F16L 59/065* (2006.01)
*B01D 53/02* (2006.01)

(52) U.S. Cl.
USPC .............................................. 96/108; 428/69

(58) Field of Classification Search
USPC .......... 96/108, 153, 154; 62/440, 269; 428/69
See application file for complete search history.

(56) References Cited

U.S. PATENT DOCUMENTS

| 5,648,508 | A | 7/1997 | Yaghi |
| 7,309,380 | B2 * | 12/2007 | Muller et al. .................... 95/141 |
| 8,308,852 | B2 * | 11/2012 | Hashida et al. ...................... 96/9 |
| 2008/0200332 | A1 | 8/2008 | Giannantonio et al. |
| 2008/0210901 | A1 * | 9/2008 | Giannantonio et al. ... 252/181.5 |
| 2010/0181212 | A1 | 7/2010 | Koch et al. |

FOREIGN PATENT DOCUMENTS

| DE | 199 29 396 | 12/2000 |
| DE | 101 11 230 | 9/2002 |
| DE | 103 55 087 | 6/2005 |
| DE | 10 2005 053430 | 5/2007 |
| DE | 10 2006 037194 | 2/2008 |
| DE | 20 2008 000810 | 12/2008 |
| EP | 0 102 544 | 3/1984 |
| EP | 0 102 902 | 3/1984 |
| EP | 0 119 924 | 9/1984 |
| EP | 0 200 260 | 12/1986 |
| EP | 0 389 041 | 9/1990 |
| EP | 0 592 050 | 4/1994 |
| EP | 0 790 253 | 8/1997 |
| EP | 0 930 475 | 7/1999 |
| EP | 1 702 925 | 9/2006 |
| JP | 03 037156 | 2/1991 |
| WO | 94 13584 | 6/1994 |
| WO | 94 29408 | 12/1994 |
| WO | 95 19222 | 7/1995 |
| WO | 2005 003622 | 1/2005 |
| WO | 2005 026605 | 3/2005 |
| WO | 2005 049892 | 6/2005 |
| WO | 2006 120183 | 11/2006 |
| WO | 2007 013119 | 2/2007 |
| WO | 2007 023134 | 3/2007 |
| WO | 2007 054581 | 5/2007 |
| WO | 2007 131955 | 11/2007 |

OTHER PUBLICATIONS

Machine generated English translation of EP 0930475 A1, published Jul. 21, 1999.*
Rowsell et al. "Metal-organic frameworks: a new class of porous materials," Jun. 2004, Microporous and Mesoporous Materials 73 (2004) 3-14.*
International Search Report issued Aug. 5, 2010 in PCT/EP10/050268 filed Jan. 12, 2010.

* cited by examiner

*Primary Examiner* — Frank Lawrence, Jr.
(74) *Attorney, Agent, or Firm* — Oblon, Spivak, McClelland, Maier & Neustadt, L.L.P.

(57) ABSTRACT

A vacuum insulation unit having at least one thermally insulating, evacuatable porous core material which is sealed in an airtight manner and a sorption medium, wherein the sorption medium containing at least one porous metal-organic framework comprising at least one at least bidentate organic compound coordinated to at least one metal ion.

12 Claims, No Drawings

VACUUM INSULATION UNITS COMPRISING GETTER MATERIALS

This application is a 371 of PCT/EP2010/050268 filed Jan. 12, 2010. Priority to European patent application No. 09150521.4 filed Jan. 14, 2009, is claimed.

The present invention relates to vacuum insulation units, shaped bodies comprising these and also the use of porous metal-organic frameworks as getter material in a vacuum insulation unit.

Vacuum insulation units are employed, inter alia, for refrigeration appliance housings, containers for refrigerated vehicles or district heating pipes. Owing to their low thermal conductivity, they offer advantages over conventional insulation materials. Thus, the energy saving potential compared to closed-cell rigid polyurethane foams is more than 20%.

Such vacuum insulation units generally comprise a thermally insulating core material, for example open-cell rigid polyurethane (PUR) foam, open-cell extruded polystyrene foam, silica gels, glass fibers, polymer beds, pressed milled rigid or semirigid PUR foam, perlite, etc., which is packed in a gastight film, evacuated and heat sealed so as to be airtight.

In terms of the long-term stability of the vacuum insulation units, the pressure increase in their interior is critical. The pressure increase impairs the insulating action of the vacuum insulation units. Firstly, constituents of the surrounding air diffuse through the film into the interior of the vacuum insulation units over time, and secondly substances can outgas from the core material used. Thus, when open-cell rigid polyurethane foam is used as core material, constituents of blowing agents, activators or cell regulators can outgas from the foam.

For this reason, sorption media, also referred to as getter materials, are introduced into the vacuum insulation units. The action of these sorption media is based on the removal of air, moisture and outgassing constituents of the core materials in the vacuum insulation units by adsorption or absorption. The mechanisms of the sorption effect are not always known for certain and can, for example, be based on chemical or physical bonding to the sorbent. The effectiveness of the uptake of gas is dependent not only on the specific surface area and the composition of the sorbent but also on the gas constituents.

In vacuum technology, getter materials such as zeolites (molecular sieves) and activated carbons are used. Owing to the differing nature of the gases to be absorbed, combinations of a plurality of sorption media have frequently also been proposed.

Vacuum insulation units comprising specific microporous activated carbons are described, for example, in EP-A 930 475.

Mixtures of getter materials for vacuum insulation units are also known from DE-A 199 29 396.

A particular sorption action is required particularly when using open-cell rigid polyurethane foams as core material for vacuum insulation units because of the abovementioned outgassing problems. The sorption media or sorption medium combinations mentioned do not always meet this requirement in a satisfactory manner. The various sorbents can also have a differing absorption profile over time.

Another great problem is the removal of hydrogen from the vacuum insulation unit. The hydrogen can be formed by chemical reaction of, for example, acids with the aluminum layer of the multilayer composite films frequently used as film material. However, it is also possible for it to get into the interior of the vacuum insulation unit from the atmosphere surrounding the unit.

It is therefore an object of the present invention to provide improved vacuum insulation units comprising sorption media which can at least partly alleviate the problems indicated above.

The object is achieved by a vacuum insulation unit comprising at least one thermally insulating, evacuatable porous core material which is sealed in an airtight manner and a sorption medium, wherein the sorption medium comprises at least one porous metal-organic framework comprising at least one at least bidentate organic compound coordinated to at least one metal ion.

It has been found that the use of porous metal-organic frameworks can make it possible to achieve an at least partly improved maintenance of the vacuum, in particular by absorption of gases such as hydrocarbons, in particular n-pentane, and also oxygen, nitrogen and/or hydrogen.

The sorption medium is generally used in the concentration range from 0.01 g to 50 g, preferably from 0.05 g to 30 g, per liter of void volume of the vacuum insulation unit. In general, the enclosed volume corresponds to the volume of the core material. The sorption medium in the vacuum insulation unit of the invention can be a porous metal-organic framework or a mixture of a plurality of porous metal-organic frameworks, for example 2, 3, 4, 5, 6, 7 or 8 different porous metal-organic frameworks.

The at least one porous metal-organic framework or the various porous metal-organic frameworks can be present, independently of one another, in powder form or as shaped bodies.

Such metal-organic frameworks (MOFs) are known in the prior art and are described, for example, in U.S. Pat. No. 5,648,508, EP-A-0 790 253, M. O'Keeffe et al., J. Sol. State Chem., 152 (2000), pages 3 to 20, H. Li et al., Nature 402, (1999), page 276, M. Eddaoudi et al., Topics in Catalysis 9, (1999), pages 105 to 111, B. Chen et al., Science 291, (2001), pages 1021 to 1023, DE-A-101 11 230, DE-A 10 2005 053430, WO-A 2007/054581, WO-A 2005/049892 and WO-A 2007/023134.

As a specific group of these metal-organic frameworks, the recent literature has described "limited" frameworks in the case of which, due to specific choice of the organic compound, the framework does not extent infinitely but forms polyhedra. A. C. Sudik, et al., J. Am. Chem. Soc. 127 (2005), 7110-7118, describe such specific frameworks. To distinguish these, they are referred to as metal-organic polyhedra (MOP).

A further specific group of porous metal-organic frameworks is formed by those in which the organic compound as ligand is a monocyclic, bicyclic or polycyclic ring system which is derived from at least one heterocycle selected from the group consisting of pyrrole, alpha-pyridone and gamma-pyridone and has at least two ring nitrogens. The electrochemical preparation of such frameworks is described in WO-A 2007/131955.

The general suitability of metal-organic frameworks for the sorption of gases and liquids is described, for example, in WO-A 2005/003622 and EP-A 1 702 925.

These specific groups are particularly useful for the purposes of the present invention.

The metal-organic frameworks of the present invention comprise pores, in particular micropores and/or mesopores. Micropores are defined as pores having a diameter of 2 nm or less and mesopores are defined by a diameter in the range from 2 to 50 nm, in each case in accordance with the definition given in Pure & Applied Chem. 57 (1983), 603-619, in particular on page 606. The presence of micropores and/or mesopores can be checked by means of sorption measurements which determine the uptake capacity of the MOF for nitrogen at 77 kelvin in accordance with DIN 66131 and/or DIN 66134.

The specific surface area, calculated according to the Langmuir model (DIN 66131, 66134), of an MOF in powder form is preferably greater than 100 m$^2$/g, more preferably above 300 m$^2$/g, more preferably greater than 700 m$^2$/g, even more preferably greater than 800 m$^2$/g, even more preferably greater than 1000 m$^2$/g and particularly preferably greater than 1200 m$^2$/g.

Shaped bodies comprising metal-organic frameworks can have a lower active surface area, but this is preferably greater than 150 m$^2$/g, more preferably greater than 300 m$^2$/g, even more preferably greater than 700 m$^2$/g.

The metal component in the framework according to the present invention is preferably selected from groups Ia, IIa, IIIa, IVa to VIIIa and Ib to VIb. Particular preference is given to Mg, Ca, Sr, Ba, Sc, Y, Ln, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi, where Ln represents lanthanides.

Lanthanides are La, Ce, Pr, Nd, Pm, Sm, En, Gd, Tb, Dy, Ho, Er, Tm, Yb.

With regard to the ions of these elements, particular mention may be made of $Mg^{2+}$, $Ca^{2+}$, $Sr^{2+}$, $Ba^{2+}$, $Sc^{3+}$, $Y^{3+}$, $Ln^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$.

Particular preference is given to Mg, Al, Y, Sc, Zr, Ti, V, Cr, Mo, Fe, Co, Cu, Ni, Zn, Ln. Greater preference is given to Al, Mo, Y, Sc, Mg, Fe, Cu and Zn. Very particular preference is given to Sc, Al, Cu and Zn.

The term "at least by bidentate organic compound" refers to an organic compound which comprises at least one functional group which is able to form at least two coordinate bonds to a given metal ion and/or a coordinate bond to each of two or more, preferably two, metal atoms.

As functional groups via which the coordinate bonds mentioned can be formed, particular mention may be made of, for example, the following functional groups: —$CO_2H$, —$CS_2H$, —$NO_2$, —$B(OH)_2$, —$SO_3H$, —$Si(OH)_3$, —$Ge(OH)_3$, —$Sn(OH)_3$, —$Si(SH)_4$, —$Ge(SH)_4$, —$Sn(SH)_3$, —$PO_3H$, —$AsO_3H$, —$AsO_4H$, —$P(SH)_3$, —$As(SH)_3$, —$CH(RSH)_2$, —$C(RSH)_3$, —$CH(RNH_2)_2$, —$C(RNH_2)_3$, —$CH(ROH)_2$, —$C(ROH)_3$, —$CH(RCN)_2$, —$C(RCN)_3$, where R is, for example, preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic rings, for example 2$C_6$ rings, which may, if appropriate, be fused and may be independently substituted by at least one substituent in each case and/or may comprise, independently of one another, at least one heteroatom such as N, O and/or S. In likewise preferred embodiments, functional groups in which the above-mentioned radical R is not present are possible. Such groups are, inter alia, —$CH(SH)_2$, —$C(SH)_3$, —$CH(NH_2)_2$, —$C(NH_2)_3$, —$CH(OH)_2$, —$C(OH)_3$, —$CH(CN)_2$ or —$C(CN)_3$.

However, the functional groups can also be heteroatoms of a heterocycle. Particular mention may here be made of nitrogen atoms.

The at least two functional groups can in principle be any suitable organic compound, as long as it is ensured that the organic compound in which these functional groups are present is capable of forming the coordinate bond and producing the framework.

The organic compounds which comprise the at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. More preferably, the aliphatic compound or the aliphatic part of the both aliphatic and aromatic compound comprises from 1 to 15, more preferably from 1 to 14, more preferably from 1 to 13, more preferably from 1 to 12, more preferably from 1 to 11 and particularly preferably from 1 to 10, carbon atoms, for example 1, 2, 3, 4, 5, 6, 7, 8, 9 or 10 carbon atoms. Particular preference is here given to, inter alia, methane, adamantane, acetylene, ethylene or butadiene.

The aromatic compound or the aromatic part of the both aromatic and aliphatic compound can have one or more rings, for example two, three, four or five rings, with the rings being able to be separate from one another and/or at least two rings being able to be present in fused form. The aromatic compound or the aromatic part of the both aliphatic and aromatic compound particularly preferably has one, two or three rings, with one or two rings being particularly preferred. Furthermore, each ring of the specified compound can independently comprise at least one heteroatom such as N, O, S, B, P, Si, Al, preferably N, O and/or S. The aromatic compound or the aromatic part of the both aromatic and aliphatic compound more preferably comprises one or two $C_6$ rings which are present either separately or in fused form. Particular mention may be made of benzene, naphthalene and/or biphenyl and/or bipyridyl and/or pyridyl as aromatic compounds.

The at least bidentate organic compound is more preferably an aliphatic or aromatic, acyclic or cyclic hydrocarbon which has from 1 to 18, preferably from 1 to 10 and in particular 6, carbon atoms and also has exclusively 2, 3 or 4 carboxyl groups as functional groups.

For example, the at least bidentate organic compound is derived from a dicarboxylic acid such as oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecane-dicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diamino-phenylmethane-3,3'-dicarboxylic acid, quinoline-3,4-dicarboxylic acid, 7-chloro-4-hydroxyquinoline-2,8-dicarboxylic acid, diimidecarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyrane-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octa-dicarboxylic acid, pentane-3,3-carboxylic acid, 4,4'-diamino-1,1'-diphenyl-3,3'-di-carboxylic acid, 4,4'-diaminodiphenyl-3,3'-dicarboxylic acid, benzidine-3,3'-dicarboxylic acid, 1,4-bis(phenylamino)benzene-2,5-dicarboxylic acid, 1,1'- binaphthyldicarboxylic acid, 7-chloro-8-methylquinoline-2,3-dicarboxylic acid, 1-anilinoanthraquinone-2,4'-dicarboxylic acid, polytetrahydrofuran 250-dicarboxylic acid, 1,4-bis(carboxy-methyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexa-chloro-5-norbornene-2,3-dicarboxylic acid, phenylindandicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-di-benzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxy-benzophenon-dicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(di-phenyl ether)diimidedicarboxylic acid, 4,4'-diaminodiphenylmethanediimidedicarboxylic acid, 4,4'-diamino(diphenyl sulfone)diimidedicarboxylic acid, 1,4-naphthalene-dicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4"-dicarboxylic acid, (diphenyl ether)-4,4'-dicarboxylic acid, imidazole-4,5-di-carboxylic acid, 4(1H)-oxothiochromene-2,8-dicarboxylic acid, 5-tert-butyl-1,3-benzene-dicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetra-decanedicarboxylic acid, 1,7-heptadicarboxylic acid, 5-hydroxy-1,3-benzene-dicarboxylic acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclo-hexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenon-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetra-decanedicarboxylic acid, 5,6-dehydronorbornane-2,3-dicarboxylic acid, 5-ethyl-2,3-pyridinedicarboxylic acid or camphordicarboxylic acid.

Furthermore, the at least bidentate organic compound is more preferably one of the dicarboxylic acids mentioned by way of example above as such.

For example, the at least bidentate organic compound can be derived from a tricarboxylic acid such as 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tri-carboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

Furthermore, the at least bidentate organic compound is more preferably one of the tricarboxylic acids mentioned by way of example above as such.

Examples of an at least bidentate organic compound derived from a tetracarboxylic acid are 1,1-dioxidoperylo[1,12-BCD]thiophene-3,4,9,10-tetra-carboxylic acid, perylenetetra-carboxylic acids such as perylene-3,4,9,10-tetracarboxylic acid or (perylene-1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naph-thalenetetracarboxylic acid, 1,2,9,10-decanetetracarboxylic acid, benzophenon-tetracarboxylic acid, 3,3',4,4'-benzophenontetracarboxylic acid, tetrahydro-furantetracarboxylic acid or cyclopentanetetracarboxylic acids such as cyclopentane-1,2,3,4-tetracarboxylic acid.

Furthermore, the at least bidentate organic compound is more preferably one of the tetracarboxylic acids mentioned by way of example above as such.

Preferred heterocycles as at least bidentate organic compounds which form a coordinate bond via the ring heteroatoms are the following substituted or unsubstituted ring systems:

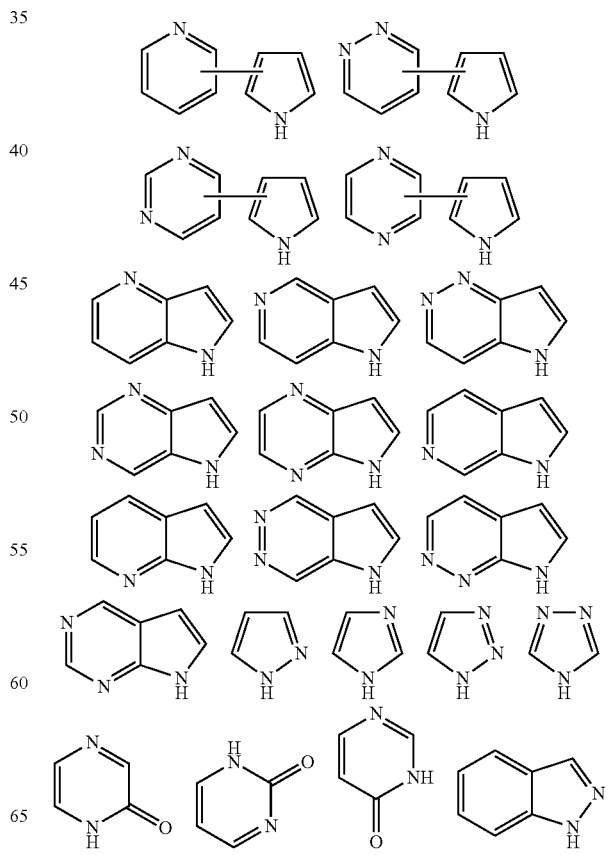

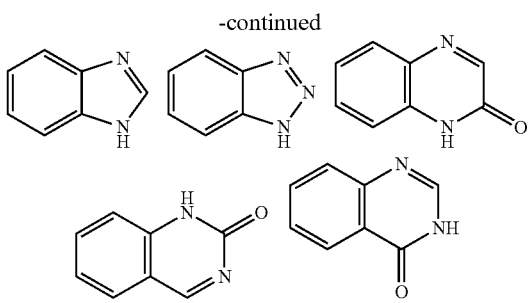

Very particular preference is given to optionally at least monosubstituted aromatic dicarboxylic, tricarboxylic or tetracarboxylic acids having one, two, three, four or more rings, with each of the rings being able to comprise at least one heteroatom and two or more rings being able to comprise identical or different heteroatoms. For example, preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, and preferred heteroatoms are N, S and/or O, Suitable substituents here are, inter alia, —OH, a nitro group, an amino group and an alkyl or alkoxy group.

Particularly preferred at least bidentate organic compounds are imidazolates such as 2-methylimidazolate, acetylenedicarboxylic acid (ADC), camphordicarboxylic acid, fumaric acid, succinic acid, benzenedicarboxylic acids such as phthalic acid, isophthalic acid, terephthalic acid (BDC), aminoterephthalic acid, triethylenediamine (TEDA), naphthalenedicarboxylic acids (NDC), biphenyldicarboxylic acids such as 4,4'-biphenyldicarboxylic acid (BPDC), pyrazinedicarboxylic acids such as 2,5-pyrazine-dicarboxylic acid, bipyridinedicarboxylic acids such as 2,2'-bipyridinedicarboxylic acids such as 2,2'-bipyridine-5,5'-dicarboxylic acid, benzenetricarboxylic acids such as 1,2,3-, 1,2,4-benzenetricarboxylic acid or 1,3,5-benzenetricarboxylic acid (BTC), benzenetetracarboxylic acid, adamantanetetracarboxylic acid (ATC), adamantanedibenzoate (ADB), benzenetribenzoate (BTB), methanetetrabenzoate (MTB), adamantanetetrabenzoate or dihydroxyterephthalic acids such as 2,5-dihydroxyterephthalic acid (DHBDC), tetrahydropyrene-2,7-dicarboxylic acid (HPDC), biphenyltetracarboxylic acid (BPTC), 1,3-bis(4-pyridyl)propane (BPP).

Very particular preference is given to using, inter alia, 2-methylimidazole, 2-ethylimidazole, phthalic acid, isophthalic acid, terephthalic acid, 2,6-naphthalenedicarboxylic acid, 1,4-naphthalenedicarboxylic acid, 1,5-naphthalene-dicarboxylic acid, 1,2,3-benzenetricarboxylic acid, 1,2,4-benzenetricarboxylic acid, 1,3,5-benzenetricarboxylic acid, 1,2,4,5-benzenetetracarboxylic acid, aminoBDC, TEDA, fumaric acid, biphenyldicarboxylate, 1,5- and 2,6-naphthalenedicarboxylic acid, tert-butylisophthalic acid, dihydroxybenzoic acid, BTB, HPDC, BPTC, BPP.

Apart from these at least bidentate organic compounds, the metal-organic framework can also comprise one or more monodentate ligands and/or one or more at least bidentate ligands which are not derived from a dicarboxylic, tricarboxylic or tetracarboxylic acid.

Apart from these at least bidentate organic compounds, the metal-organic framework can also comprise one or more monodentate ligands.

Suitable solvents for preparing the metal-organic framework are, inter alia, ethanol, dimethylformamide, toluene, methanol, chlorobenzene, diethylformamide, dimethyl sulfoxide, water, hydrogen peroxide, methylamine, sodium hydroxide solution, N-methylpyrrolidone ether, acetonitrile, benzyl chloride, triethylamine, ethylene glycol and mixtures thereof. Further metal ions, at least bidentate organic compounds and solvents for the preparation of MOFs are described, inter alia, in U.S. Pat. No. 5,648,508 or DE-A 101 11 230.

The pore size of the metal-organic framework can be controlled by selection of the appropriate ligand and/or the at least bidentate organic compound. In general, the larger the organic compound, the larger the pore size. The pore size is preferably from 0.2 nm to 30 nm, particularly preferably in the range from 0.3 nm to 3 nm, based on the crystalline material.

However, larger pores whose size distribution can vary also occur in a shaped body comprising a metal-organic framework. Preference is nevertheless given to more than 50% of the total pore volume, in particular more than 75%, being made up by pores having a pore diameter of up 1000 nm. However, preference is given to a major part of the pore volume being made up by pores from two diameter ranges. It is therefore more preferred that more than 25% of the total pore volume, in particular more than 50% of the total pore volume, is formed by pores which are in a diameter range from 100 nm to 800 nm and that more than 15% of the total pore volume, in particular more than 25% of the total pore volume, is formed by pores which are in a diameter range up to 10 nm. The pore distribution can be determined by means of mercury porosimetry.

Examples of metal-organic frameworks are given below. In addition to the designation of the framework, the metal and the at least bidentate ligand, the solvent and the cell parameters (angles α, β and γ and the dimensions A, B and C in Å) are indicated. The latter were determined by X-ray diffraction.

| MOF-n | Constituents Molar ratio M + L | Solvents | α | β | γ | a | b | c | Space group |
|---|---|---|---|---|---|---|---|---|---|
| MOF-0 | Zn(NO$_3$)$_2$·6H$_2$O H$_3$(BTC) | ethanol | 90 | 90 | 120 | 16.711 | 16.711 | 14.189 | P6(3)/Mcm |
| MOF-2 | Zn(NO$_3$)$_2$·6H$_2$O (0.246 mmol) H$_2$(BDC) 0.241 mmol) | DMF toluene | 90 | 102.8 | 90 | 6.718 | 15.49 | 12.43 | P2(1)/n |
| MOF-3 | Zn(NO$_3$)$_2$·6H$_2$O (1.89 mmol) H$_2$(BDC) (1.93 mmol) | DMF MeOH | 99.72 | 111.11 | 108.4 | 9.726 | 9.911 | 10.45 | P-1 |

-continued

| MOF-n | Constituents Molar ratio M + L | Solvents | α | β | γ | a | b | c | Space group |
|---|---|---|---|---|---|---|---|---|---|
| MOF-4 | Zn(NO$_3$)$_2$·6H$_2$O (1.00 mmol) H$_3$(BTC) (0.5 mmol) | ethanol | 90 | 90 | 90 | 14.728 | 14.728 | 14.728 | P2(1)3 |
| MOF-5 | Zn(NO$_3$)$_2$·6H$_2$O (2.22 mmol) H$_2$(BDC) (2.17 mmol) | DMF chlorobenzene | 90 | 90 | 90 | 25.669 | 25.669 | 25.669 | Fm-3m |
| MOF-38 | Zn(NO$_3$)$_2$·6H$_2$O (0.27 mmol) H$_3$(BTC) (0.15 mmol) | DMF chlorobenzene | 90 | 90 | 90 | 20.657 | 20.657 | 17.84 | I4cm |
| MOF-31 Zn(ADC)$_2$ | Zn(NO$_3$)$_2$·6H$_2$O 0.4 mmol H$_2$(ADC) 0.8 mmol | ethanol | 90 | 90 | 90 | 10.821 | 10.821 | 10.821 | Pn(-3)m |
| MOF-12 Zn$_2$(ATC) | Zn(NO$_3$)$_2$·6H$_2$O 0.3 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$·6H$_2$O 0.37 mmol H$_2$NDC 0.36 mmol | DMF chlorobenzene | 90 | 92.13 | 90 | 8.13 | 16.444 | 12.807 | P2(1)/c |
| MOF-37 | Zn(NO$_3$)$_2$·6H$_2$O 0.2 mmol H$_2$NDC 0.2 mmol | DEF chlorobenzene | 72.38 | 83.16 | 84.33 | 9.952 | 11.576 | 15.556 | P-1 |
| MOF-8 Tb$_2$(ADC) | Tb(NO$_3$)$_3$·5H$_2$O 0.10 mmol H$_2$ADC 0.20 mmol | DMSO MeOH | 90 | 115.7 | 90 | 19.83 | 9.822 | 19.183 | C2/c |
| MOF-9 Tb$_2$(ADC) | Tb(NO$_3$)$_3$·5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$·5H$_2$O 0.30 mmol H$_2$(BDC) 0.30 mmol | DMF MeOH | 90 | 91.28 | 90 | 17.599 | 19.996 | 10.545 | P21/c |
| MOF-7 | Tb(NO$_3$)$_3$·5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$·6H$_2$O 0.083 mmol 4,4'BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$·6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 Cu$_2$(ATC) | Cu(NO$_3$)$_2$·2.5H$_2$O 0.47 mmol H$_2$ATC 0.22 mmol | H$_2$O | 90 | 93.86 | 90 | 12.987 | 11.22 | 11.336 | C2/c |
| MOF-11 CU$_2$(ATC) dehydr. | | | 90 | 90 | 90 | 8.4671 | 8.4671 | 14.44 | P42/mmc |
| MOF-14 Cu$_3$(BTB) | Cu(NO$_3$)$_2$·2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$·4H$_2$O 0.24 mmol H$_4$ATC 0.10 mmol | H$_2$O NaOH | 90 | 90 | 90 | 13.468 | 13.468 | 13.468 | P(-4)3m |
| MOF-33 Zn$_2$(ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$·6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |

-continued

| MOF-n | Constituents Molar ratio M + L | Solvents | α | β | γ | a | b | c | Space group |
|---|---|---|---|---|---|---|---|---|---|
| MOF-36 Zn₂ (MTB) | Zn(NO₃)₂•4H₂O 0.20 mmol H₄MTB 0.04 mmol | H₂O DMF | 90 | 90 | 90 | 15.745 | 16.907 | 18.167 | Pbca |
| MOF-39 Zn₃O(HBTB) | Zn(NO₃)₂ 4H₂O 0.27 mmol H₃BTB 0.07 mmol | H₂O DMF EtOH | 90 | 90 | 90 | 17.158 | 21.591 | 25.308 | Pnma |
| NO305 | FeCl₂•4H₂O 5.03 mmol formic acid 86.90 mmol | DMF | 90 | 90 | 120 | 8.2692 | 8.2692 | 63.566 | R-3c |
| NO306A | FeCl₂•4H₂O 5.03 mmol formic acid 86.90 mmol | DEF | 90 | 90 | 90 | 9.9364 | 18.374 | 18.374 | Pbcn |
| NO29 MOF-0 similar | Mn(Ac)₂•4H₂O 0.46 mmol H₃BTC 0.69 mmol | DMF | 120 | 90 | 90 | 14.16 | 33.521 | 33.521 | P-1 |
| BPR48 A2 | Zn(NO₃)₂ 6H₂O 0.012 mmol H₂BDC 0.012 mmol | DMSO toluene | 90 | 90 | 90 | 14.5 | 17.04 | 18.02 | Pbca |
| BPR69 B1 | Cd(NO₃)₂ 4H₂O 0.0212 mmol H₂BDC 0.0428 mmol | DMSO | 90 | 98.76 | 90 | 14.16 | 15.72 | 17.66 | Cc |
| BPR92 A2 | Co(NO₃)₂•6H₂O 0.018 mmol H₂BDC 0.018 mmol | NMP | 106.3 | 107.63 | 107.2 | 7.5308 | 10.942 | 11.025 | P1 |
| BPR95 C5 | Cd(NO₃)₂ 4H₂O 0.012 mmol H₂BDC 0.36 mmol | NMP | 90 | 112.8 | 90 | 14.460 | 11.085 | 15.829 | P2(1)/n |
| Cu C₆H₄O₆ | Cu(NO₃)₂•2.5H₂O 0.370 mmol H₂BDC(OH)₂ 0.37 mmol | DMF chloro-benzene | 90 | 105.29 | 90 | 15.259 | 14.816 | 14.13 | P2(1)/c |
| M(BTC) MOF-0 similar | Co(SO₄) H₂O 0.055 mmol H₃BTC 0.037 mmol | DMF | | as for MOF-0 | | | | | |
| Tb(C₆H₄O₆) | Tb(NO₃)₃•5H₂O 0.370 mmol H₂(C₆H₄O₆) 0.56 mmol | DMF chloro-benzene | 104.6 | 107.9 | 97.147 | 10.491 | 10.981 | 12.541 | P-1 |
| Zn (C₂O₄) | ZnCl₂ 0.370 mmol oxalic acid 0.37 mmol | DMF chloro-benzene | 90 | 120 | 90 | 9.4168 | 9.4168 | 8.464 | P(-3)1m |
| Co(CHO) | Co(NO₃)₂•5H₂O 0.043 mmol formic acid 1.60 mmol | DMF | 90 | 91.32 | 90 | 11.328 | 10.049 | 14.854 | P2(1)/n |
| Cd(CHO) | Cd(NO₃)₂•4H₂O 0.185 mmol formic acid 0.185 mmol | DMF | 90 | 120 | 90 | 8.5168 | 8.5168 | 22.674 | R-3c |
| Cu(C₃H₂O₄) | Cu(NO₃)₂•2.5H₂O 0.043 mmol malonic acid 0.192 mmol | DMF | 90 | 90 | 90 | 8.366 | 8.366 | 11.919 | P43 |
| Zn₆ (NDC)₅ MOF-48 | Zn(NO₃)₂•6H₂O 0.097 mmol 14 NDC 0.069 mmol | DMF chloro-benzene H₂O₂ | 90 | 95.902 | 90 | 19.504 | 16.482 | 14.64 | C2/m |
| MOF-47 | Zn(NO₃)₂ 6H₂O 0.185 mmol H₂(BDC[CH₃]₄) 0.185 mmol | DMF chloro-benzene H₂O₂ | 90 | 92.55 | 90 | 11.303 | 16.029 | 17.535 | P2(1)/c |
| MO25 | Cu(NO₃)₂•2.5H₂O 0.084 mmol BPhDC 0.085 mmol | DMF | 90 | 112.0 | 90 | 23.880 | 16.834 | 18.389 | P2(1)/c |

-continued

| MOF-n | Constituents Molar ratio M + L | Solvents | α | β | γ | a | b | c | Space group |
|---|---|---|---|---|---|---|---|---|---|
| Cu-Thio | Cu(NO$_3$)$_2$·2.5H$_2$O 0.084 mmol thiophene-dicarboxylic acid 0.085 mmol | DEF | 90 | 113.6 | 90 | 15.4747 | 14.514 | 14.032 | P2(1)/c |
| ClBDC1 | Cu(NO$_3$)$_2$·2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$·2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_3$BTC 0.033 mmol | DMF EtOH base added | 90 | 90 | 90 | 26.572 | 26.572 | 26.572 | Fm-3m |
| MOF-j | Co(CH$_3$CO$_2$)$_2$·4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$·6H$_2$O H$_3$(BTC) | ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF ethanol | 90 | 102.7 | 90 | 8.3639 | 17.991 | 9.9617 | P2(1)/n |
| Znhex | Zn(NO$_3$)$_2$·6H$_2$O (0.171 mmol) H$_3$BTB (0.114 mmol) | DMF p-xylene ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_3$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. ethanol | 90 | 90 | 120 | 12.535 | 12.535 | 18.479 | P6(2)c |
| AS54-3 | FeBr$_2$ 0.927 BPDC 0.927 mmol | DMF anhydr. n-propanol | 90 | 109.98 | 90 | 12.019 | 15.286 | 14.399 | C2 |
| AS61-4 | FeBr$_2$ 0.927 mmol m-BDC 0.927 mmol | pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. pyridine | 90 | 90 | 90 | 18.3407 | 10.036 | 18.039 | Pca2$_1$ |
| Zn(ADC) | Zn(NO$_3$)$_2$·6H$_2$O 0.37 mmol H$_2$(ADC) 0.36 mmol | DMF chloro-benzene | 90 | 99.85 | 90 | 16.764 | 9.349 | 9.635 | C2/c |
| MOF-12 Zn$_2$ (ATC) | Zn(NO$_3$)$_2$·6H$_2$O 0.30 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$·6H$_2$O 0.37 mmol H$_2$NDC 0.36 mmol | DMF chloro-benzene | 90 | 92.13 | 90 | 8.13 | 16.444 | 12.807 | P2(1)/c |
| MOF-37 | Zn(NO$_3$)$_2$·6H$_2$O 0.20 mmol H$_2$NDC 0.20 mmol | DEF chloro-benzene | 72.38 | 83.16 | 84.33 | 9.952 | 11.576 | 15.556 | P-1 |
| Zn(NDC) (DMSO) | Zn(NO$_3$)$_2$·6H$_2$O H$_2$NDC | DMSO | 68.08 | 75.33 | 88.31 | 8.631 | 10.207 | 13.114 | P-1 |
| Zn(NDC) | Zn(NO$_3$)$_2$·6H$_2$O H$_2$NDC | | 90 | 99.2 | 90 | 19.289 | 17.628 | 15.052 | C2/c |

| MOF-n | Constituents Molar ratio M + L | Solvents | α | β | γ | a | b | c | Space group |
|---|---|---|---|---|---|---|---|---|---|
| Zn(HPDC) | Zn(NO₃)₂•4H₂O 0.23 mmol H₂(HPDC) 0.05 mmol | DMF H₂O | 107.9 | 105.06 | 94.4 | 8.326 | 12.085 | 13.767 | P-1 |
| Co(HPDC) | Co(NO₃)₂•6H₂O 0.21 mmol H₂(HPDC) 0.06 mmol | DMF H₂O/ ethanol | 90 | 97.69 | 90 | 29.677 | 9.63 | 7.981 | C2/c |
| Zn₃(PDC)2.5 | Zn(NO₃)₂•4H₂O 0.17 mmol H₂(HPDC) 0.05 mmol | DMF/ ClBz H₂0/TEA | 79.34 | 80.8 | 85.83 | 8.564 | 14.046 | 26.428 | P-1 |
| Cd₂(TPDC)2 | Cd(NO₃)₂•4H₂O 0.06 mmol H₂(HPDC) 0.06 mmol | methanol/ CHP H₂O | 70.59 | 72.75 | 87.14 | 10.102 | 14.412 | 14.964 | P-1 |
| Tb(PDC)1.5 | Tb(NO₃)₃•5H₂O 0.21 mmol H₂(PDC) 0.034 mmol | DMF H₂O/ ethanol | 109.8 | 103.61 | 100.14 | 9.829 | 12.11 | 14.628 | P-1 |
| ZnDBP | Zn(NO₃)₂•6H₂O 0.05 mmol dibenzyl phosphate 0.10 mmol | MeOH | 90 | 93.67 | 90 | 9.254 | 10.762 | 27.93 | P2/n |
| Zn₃(BPDC) | ZnBr₂ 0.021 mmol 4,4'BPDC 0.005 mmol | DMF | 90 | 102.76 | 90 | 11.49 | 14.79 | 19.18 | P21/n |
| CdBDC | Cd(NO₃)₂•4H₂O 0.100 mmol H₂(BDC) 0.401 mmol | DMF Na₂SiO₃ (aq) | 90 | 95.85 | 90 | 11.2 | 11.11 | 16.71 | P21/n |
| Cd-mBDC | Cd(NO₃)₂•4H₂O 0.009 mmol H₂(mBDC) 0.018 mmol | DMF MeNH₂ | 90 | 101.1 | 90 | 13.69 | 18.25 | 14.91 | C2/c |
| Zn₄OBNDC | Zn(NO₃)₂•6H₂O 0.041 mmol BNDC | DEF MeNH₂ H₂O₂ | 90 | 90 | 90 | 22.35 | 26.05 | 59.56 | Fmmm |
| Eu(TCA) | Eu(NO₃)₃•6H₂O 0.14 mmol TCA 0.026 mmol | DMF chloro- benzene | 90 | 90 | 90 | 23.325 | 23.325 | 23.325 | Pm-3n |
| Tb(TCA) | Tb(NO₃)₃•6H₂O 0.069 mmol TCA 0.026 mmol | DMF chloro- benzene | 90 | 90 | 90 | 23.272 | 23.272 | 23.372 | Pm-3n |
| Formates | Ce(NO₃)₃•6H₂O 0.138 mmol formic acid 0.43 mmol | H₂O ethanol | 90 | 90 | 120 | 10.668 | 10.667 | 4.107 | R-3m |
|  | FeCl₂•4H₂O 5.03 mmol formic acid 86.90 mmol | DMF | 90 | 90 | 120 | 8.2692 | 8.2692 | 63.566 | R-3c |
|  | FeCl₂•4H₂O 5.03 mmol formic acid 86.90 mmol | DEF | 90 | 90 | 90 | 9.9364 | 18.374 | 18.374 | Pbcn |
|  | FeCl₂•4H₂O 5.03 mmol formic acid 86.90 mmol | DEF | 90 | 90 | 90 | 8.335 | 8.335 | 13.34 | P-31c |
| NO330 | FeCl₂•4H₂O 0.50 mmol formic acid 8.69 mmol | formamide | 90 | 90 | 90 | 8.7749 | 11.655 | 8.3297 | Pnna |
| NO332 | FeCl₂•4H₂O 0.50 mmol formic acid 8.69 mmol | DIP | 90 | 90 | 90 | 10.0313 | 18.808 | 18.355 | Pbcn |
| NO333 | FeCl₂•4H₂O 0.50 mmol formic acid 8.69 mmol | DBF | 90 | 90 | 90 | 45.2754 | 23.861 | 12.441 | Cmcm |

-continued

| MOF-n | Constituents Molar ratio M + L | Solvents | α | β | γ | a | b | c | Space group |
|---|---|---|---|---|---|---|---|---|---|
| NO335 | $FeCl_2 \cdot 4H_2O$ 0.50 mmol formic acid 8.69 mmol | CHF | 90 | 91.372 | 90 | 11.5964 | 10.187 | 14.945 | P21/n |
| NO336 | $FeCl_2 \cdot 4H_2O$ 0.50 mmol formic acid 8.69 mmol | MFA | 90 | 90 | 90 | 11.7945 | 48.843 | 8.4136 | Pbcm |
| NO13 | $Mn(Ac)_2 \cdot 4H_2O$ 0.46 mmol benzoic acid 0.92 mmol bipyridine 0.46 mmol | ethanol | 90 | 90 | 90 | 18.66 | 11.762 | 9.418 | Pbcn |
| NO29 MOF-0 similar | $Mn(Ac)_2 \cdot 4H_2O$ 0.46 mmol $H_3BTC$ 0.69 mmol | DMF | 120 | 90 | 90 | 14.16 | 33.521 | 33.521 | P-1 |
| $Mn(hfac)_2$ $(O_2CC_6H_5)$ | $Mn(Ac)_2 \cdot 4H_2O$ 0.46 mmol Hfac 0.92 mmol bipyridine 0.46 mmol | ether | 90 | 95.32 | 90 | 9.572 | 17.162 | 14.041 | C2/c |
| BPR43G2 | $Zn(NO_3)_2 \cdot 6H_2O$ 0.0288 mmol $H_2BDC$ 0.0072 mmol | DMF $CH_3CN$ | 90 | 91.37 | 90 | 17.96 | 6.38 | 7.19 | C2/c |
| BPR48A2 | $Zn(NO_3)_2\, 6H_2O$ 0.012 mmol $H_2BDC$ 0.012 mmol | DMSO toluene | 90 | 90 | 90 | 14.5 | 17.04 | 18.02 | Pbca |
| BPR49B1 | $Zn(NO_3)_2\, 6H_2O$ 0.024 mmol $H_2BDC$ 0.048 mmol | DMSO methanol | 90 | 91.172 | 90 | 33.181 | 9.824 | 17.884 | C2/c |
| BPR56E1 | $Zn(NO_3)_2\, 6H_2O$ 0.012 mmol $H_2BDC$ 0.024 mmol | DMSO n-propanol | 90 | 90.096 | 90 | 14.5873 | 14.153 | 17.183 | P2(1)/n |
| BPR68D10 | $Zn(NO_3)_2\, 6H_2O$ 0.0016 mmol $H_3BTC$ 0.0064 mmol | DMSO benzene | 90 | 95.316 | 90 | 10.0627 | 10.17 | 16.413 | P2(1)/c |
| BPR69B1 | $Cd(NO_3)_2\, 4H_2O$ 0.0212 mmol $H_2BDC$ 0.0428 mmol | DMSO | 90 | 98.76 | 90 | 14.16 | 15.72 | 17.66 | Cc |
| BPR73E4 | $Cd(NO_3)_2\, 4H_2O$ 0.006 mmol $H_2BDC$ 0.003 mmol | DMSO toluene | 90 | 92.324 | 90 | 8.7231 | 7.0568 | 18.438 | P2(1)/n |
| BPR76D5 | $Zn(NO_3)_2\, 6H_2O$ 0.0009 mmol $H_2BzPDC$ 0.0036 mmol | DMSO | 90 | 104.17 | 90 | 14.4191 | 6.2599 | 7.0611 | Pc |
| BPR80B5 | $Cd(NO_3)_2 \cdot 4H_2O$ 0.018 mmol $H_2BDC$ 0.036 mmol | DMF | 90 | 115.11 | 90 | 28.049 | 9.184 | 17.837 | C2/c |
| BPR80H5 | $Cd(NO_3)_2\, 4H_2O$ 0.027 mmol $H_2BDC$ 0.027 mmol | DMF | 90 | 119.06 | 90 | 11.4746 | 6.2151 | 17.268 | P2/c |
| BPR82C6 | $Cd(NO_3)_2\, 4H_2O$ 0.0068 mmol $H_2BDC$ 0.202 mmol | DMF | 90 | 90 | 90 | 9.7721 | 21.142 | 27.77 | Fdd2 |
| BPR86C3 | $Co(NO_3)_2\, 6H_2O$ 0.0025 mmol $H_2BDC$ 0.075 mmol | DMF | 90 | 90 | 90 | 18.3449 | 10.031 | 17.983 | Pca2(1) |

-continued

| MOF-n | Constituents Molar ratio M + L | Solvents | α | β | γ | a | b | c | Space group |
|---|---|---|---|---|---|---|---|---|---|
| BPR86H6 | $Cd(NO_3)_2 \cdot 6H_2O$ 0.010 mmol $H_2BDC$ 0.010 mmol | DMF | 80.98 | 89.69 | 83.412 | 9.8752 | 10.263 | 15.362 | P-1 |
| | $Co(NO_3)_2\ 6H_2O$ | NMP | 106.3 | 107.63 | 107.2 | 7.5308 | 10.942 | 11.025 | P1 |
| BPR95A2 | $Zn(NO_3)_2\ 6H_2O$ 0.012 mmol $H_2BDC$ 0.012 mmol | NMP | 90 | 102.9 | 90 | 7.4502 | 13.767 | 12.713 | P2(1)/c |
| $CuC_6F_4O_4$ | $Cu(NO_3)_2 \cdot 2.5H_2O$ 0.370 mmol $H_2BDC(OH)_2$ 0.37 mmol | DMF chlorobenzene | 90 | 98.834 | 90 | 10.9675 | 24.43 | 22.553 | P2(1)/n |
| Fe Formic | $FeCl_2 \cdot 4H_2O$ 0.370 mmol formic acid 0.37 mmol | DMF | 90 | 91.543 | 90 | 11.495 | 9.963 | 14.48 | P2(1)/n |
| Mg Formic | $Mg(NO_3)_2 \cdot 6H_2O$ 0.370 mmol formic acid 0.37 mmol | DMF | 90 | 91.359 | 90 | 11.383 | 9.932 | 14.656 | P2(1)/n |
| $MgC_6H_4O_6$ | $Mg(NO_3)_2 \cdot 6H_2O$ 0.370 mmol $H_2BDC(OH)_2$ 0.37 mmol | DMF | 90 | 96.624 | 90 | 17.245 | 9.943 | 9.273 | C2/c |
| Zn $C_2H_4BDC$ MOF-38 | $ZnCl_2$ 0.44 mmol CBBDC 0.261 mmol | DMF | 90 | 94.714 | 90 | 7.3386 | 16.834 | 12.52 | P2(1)/n |
| MOF-49 | $ZnCl_2$ 0.44 mmol m-BDC 0.261 mmol | DMF $CH_3CN$ | 90 | 93.459 | 90 | 13.509 | 11.984 | 27.039 | P2/c |
| MOF-26 | $Cu(NO_3)_2 \cdot 5H_2O$ 0.084 mmol DCPE 0.085 mmol | DMF | 90 | 95.607 | 90 | 20.8797 | 16.017 | 26.176 | P2(1)/n |
| MOF-112 | $Cu(NO_3)_2 \cdot 2.5H_2O$ 0.084 mmol o-Br-m-BDC 0.085 mmol | DMF ethanol | 90 | 107.49 | 90 | 29.3241 | 21.297 | 18.069 | C2/c |
| MOF-109 | $Cu(NO_3)_2 \cdot 2.5H_2O$ 0.084 mmol KDB 0.085 mmol | DMF | 90 | 111.98 | 90 | 23.8801 | 16.834 | 18.389 | P2(1)/c |
| MOF-111 | $Cu(NO_3)_2 \cdot 2.5H_2O$ 0.084 mmol o-BrBDC 0.085 mmol | DMF ethanol | 90 | 102.16 | 90 | 10.6767 | 18.781 | 21.052 | C2/c |
| MOF-110 | $Cu(NO_3)_2 \cdot 2.5H_2O$ 0.084 mmol thiophenedicarboxylic acid 0.085 mmol | DMF | 90 | 90 | 120 | 20.0652 | 20.065 | 20.747 | R-3/m |
| MOF-107 | $Cu(NO_3)_2 \cdot 2.5H_2O$ 0.084 mmol thiophenedicarboxylic acid 0.085 mmol | DEF | 104.8 | 97.075 | 95.206 | 11.032 | 18.067 | 18.452 | P-1 |
| MOF-108 | $Cu(NO3)2 \cdot 2.5H2O$ 0.084 mmol thiophenedicarboxylic acid 0.085 mmol | DBF/ methanol | 90 | 113.63 | 90 | 15.4747 | 14.514 | 14.032 | C2/c |
| MOF-102 | $Cu(NO3)2 \cdot 2.5H2O$ 0.084 mmol H2(BDCCl2) 0.085 mmol | DMF | 91.63 | 106.24 | 112.01 | 9.3845 | 10.794 | 10.831 | P-1 |
| Clbdc1 | $Cu(NO3)2 \cdot 2.5H2O$ 0.084 mmol H2(BDCCl2) 0.085 mmol | DEF | 90 | 105.56 | 90 | 14.911 | 15.622 | 18.413 | P-1 |
| Cu(NMOP) | $Cu(NO3)2 \cdot 2.5H2O$ 0.084 mmol NBDC 0.085 mmol | DMF | 90 | 102.37 | 90 | 14.9238 | 18.727 | 15.529 | P2(1)/m |

-continued

| MOF-n | Constituents Molar ratio M + L | Solvents | α | β | γ | a | b | c | Space group |
|---|---|---|---|---|---|---|---|---|---|
| Tb(BTC) | Tb(NO3)3•5H2O 0.033 mmol H3BTC 0.033 mmol | DMF | 90 | 106.02 | 90 | 18.6986 | 11.368 | 19.721 | |
| Zn3(BTC)2 Honk | ZnCl2 0.033 mmol H3BTC 0.033 mmol | DMF ethanol | 90 | 90 | 90 | 26.572 | 26.572 | 26.572 | Fm-3m |
| Zn4O(NDC) | Zn(NO3)2•4H2O 0.066 mmol 14NDC 0.066 mmol | DMF ethanol | 90 | 90 | 90 | 41.5594 | 18.818 | 17.574 | aba2 |
| CdTDC | Cd(NO3)2•4H2O 0.014 mmol thiophene 0.040 mmol DABCO 0.020 mmol | DMF $H_2O$ | 90 | 90 | 90 | 12.173 | 10.485 | 7.33 | Pmma |
| IRMOF-2 | Zn(NO3)2•4H2O 0.160 mmol o-Br-BDC 0.60 mmol | DEF | 90 | 90 | 90 | 25.772 | 25.772 | 25.772 | Fm-3m |
| IRMOF-3 | Zn(NO3)2•4H2O 0.20 mmol H2N-BDC 0.60 mmol | DEF ethanol | 90 | 90 | 90 | 25.747 | 25.747 | 25.747 | Fm-3m |
| IRMOF-4 | Zn(NO3)2•4H2O 0.11 mmol [C3H7O]2-BDC 0.48 mmol | DEF | 90 | 90 | 90 | 25.849 | 25.849 | 25.849 | Fm-3m |
| IRMOF-5 | Zn(NO3)2•4H2O 0.13 mmol [C5H11O]2-BDC 0.50 mmol | DEF | 90 | 90 | 90 | 12.882 | 12.882 | 12.882 | Pm-3m |
| IRMOF-6 | Zn(NO3)2•4H2O 0.20 mmol [C2H4]-BDC 0.60 mmol | DEF | 90 | 90 | 90 | 25.842 | 25.842 | 25.842 | Fm-3m |
| IRMOF-7 | Zn(NO3)2•4H2O 0.07 mmol 1,4NDC 0.20 mmol | DEF | 90 | 90 | 90 | 12.914 | 12.914 | 12.914 | Pm-3m |
| IRMOF-8 | Zn(NO3)2•4H2O 0.55 mmol 2,6NDC 0.42 mmol | DEF | 90 | 90 | 90 | 30.092 | 30.092 | 30.092 | Fm-3m |
| IRMOF-9 | Zn(NO3)2•4H2O 0.05 mmol BPDC 0.42 mmol | DEF | 90 | 90 | 90 | 17.147 | 23.322 | 25.255 | Pnnm |
| IRMOF-10 | Zn(NO3)2•4H2O 0.02 mmol BPDC 0.012 mmol | DEF | 90 | 90 | 90 | 34.281 | 34.281 | 34.281 | Fm-3m |
| IRMOF-11 | Zn(NO3)2•4H2O 0.05 mmol HPDC 0.20 mmol | DEF | 90 | 90 | 90 | 24.822 | 24.822 | 56.734 | R-3m |
| IRMOF-12 | Zn(NO3)2•4H2O 0.017 mmol HPDC 0.12 mmol | DEF | 90 | 90 | 90 | 34.281 | 34.281 | 34.281 | Fm-3m |
| IRMOF-13 | $Zn(NO_3)_2$•4$H_2O$ 0.048 mmol PDC 0.31 mmol | DEF | 90 | 90 | 90 | 24.822 | 24.822 | 56.734 | R-3m |
| IRMOF-14 | $Zn(NO_3)_2$•4$H_2O$ 0.17 mmol PDC 0.12 mmol | DEF | 90 | 90 | 90 | 34.381 | 34.381 | 34.381 | Fm-3m |
| IRMOF-15 | $Zn(NO_3)_2$•4$H_2O$ 0.063 mmol TPDC 0.025 mmol | DEF | 90 | 90 | 90 | 21.459 | 21.459 | 21.459 | Im-3m |

| MOF-n | Constituents Molar ratio M + L | Solvents | α | β | γ | a | b | c | Space group |
|---|---|---|---|---|---|---|---|---|---|
| IRMOF-16 | Zn(NO₃)₂·4H₂O 0.0126 mmol TPDC 0.05 mmol | DEF NMP | 90 | 90 | 90 | 21.49 | 21.49 | 21.49 | Pm-3m |

ADC Acetylenedicarboxylic acid
NDC Naphthalenedicarboxylic acid
BDC Benzenedicarboxylic acid
ATC Adamantanetetracarboxylic acid
BTC Benzenetricarboxylic acid
BTB Benzenetribenzoic acid
MTB Methanetetrabenzoic acid
ATB Adamantanetetrabenzoic acid
ADB Adamantanedibenzoic acid Further metal-organic frameworks are MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, SZL-1, which are described in the literature.

Particularly preferred metal-organic frameworks are MIL-53, Zn-tBu-isophthalic acid, Al-BDC, MOF-5, MOF-177, MOF-505, IRMOF-8, IRMOF-11, Cu-BTC, Al-NDC, Al-aminoBDC, Cu-BDC-TEDA, Zn-BDC-TEDA, Al-BTC, Cu-BTC, Al-NDC, Mg-NDC, Al-fumarate, Zn-2-methylimidazolate, Zn-2-aminoimidazolate, Cu-biphenyldicarboxylate-TEDA, MOF-74, Cu-BPP, Sc-terephthalate. Greater preference is given to Sc-terephthalate, Al-BDC and Al-BTC.

Apart from the conventional method of preparing the MOFs, as described, for example, in U.S. Pat. No. 5,648,508, they can also be prepared by an electrochemical route. In this regard, reference is made to DE-A 103 55 087 and WO-A 2005/049892. The metal-organic frameworks prepared in this way have particularly good properties in respect of the adsorption and desorption of chemical substances, in particular gases.

Regardless of the method of preparation, the metal-organic framework is obtained in pulverulent or crystalline form. This can be used as sorbent either alone or together with other sorbents or further materials. It is preferably used as loose material. The metal-organic framework can also be converted into a shaped body. Preferred processes for this are extrusion or tableting. In the production of shaped bodies, further materials such as binders, lubricants or other additives can be added to the metal-organic framework. It is likewise conceivable to produce mixtures of framework and other adsorbents such as activated carbon as shaped bodies or for them to form separate shaped bodies which are then used as mixtures of shaped bodies.

The possible geometries of these shaped bodies are in principle not subject to any restrictions. For example, possible shapes are, inter alia, pellets such as disk-shaped pellets, pills, spheres, granules, extrudates such as rods, honeycombs, grids or hollow bodies.

The metal-organic framework is preferably present as shaped bodies. Preferred embodiments are tablets and elongated extrudates. The shaped bodies preferably have a dimension in one direction in space in the range from 0.2 mm to 30 mm, more preferably from 0.5 mm to 5 mm, in particular from 1 mm to 3 mm.

To produce the shaped bodies, it is in principle possible to employ all suitable methods. In particular, the following processes are preferred:
Kneading of the framework either alone or together with at least one binder and/or at least one pasting agent and/or at least one template compound to give a mixture; shaping of the resulting mixture by means of at least one suitable method such as extrusion; optionally washing and/or drying and/or calcination of the extrudate; optionally finishing treatment.
Application of the framework to at least one optionally porous support material. The material obtained can then be processed further by the above-described method to give a shaped body.
Application of the framework to at least one optionally porous substrate.

Kneading and shaping can be carried out by any suitable method, for example as described in Ullmanns Enzyklopädie der Technischen Chemie, 4th edition, volume 2, p. 313 ff. (1972), whose relevant contents are fully incorporated by reference into the present patent application.

For example, the kneading and/or shaping can be carried out by means of a piston press, roller press in the presence or absence of at least one binder, compounding, pelletization, tableting, extrusion, coextrusion, foaming, spinning, coating, granulation, preferably spray granulation, spraying, spray drying or a combination of two or more of these methods.

Very particular preference is given to producing pellets and/or tablets.

The kneading and/or shaping can be carried out at elevated temperatures, for example in the range from room temperature to 300° C., and/or under superatmospheric pressure, for example in the range from atmospheric pressure to a few hundred bar, and/or in a protective gas atmosphere, for example in the presence of at least one noble gas, nitrogen or a mixture of two or more thereof.

The kneading and/or shaping is, in a further embodiment, carried out with addition of at least one binder, with the binder used basically being able to be any chemical compound which ensures the desired viscosity for the kneading and/or shaping of the composition to be kneaded and/or shaped. Accordingly, binders can, for the purposes of the present invention, be either viscosity-increasing or viscosity-reducing compounds.

Preferred binders are, for example, inter alia aluminum oxide or binders comprising aluminum oxide, as are described, for example, in WO 94/29408, silicon dioxide as described, for example, in EP 0 592 050 A1, mixtures of silicon dioxide and aluminum oxide, as are described, for example, in WO 94/13584, clay minerals as described, for example, in JP 03-037156 A, for example montmorillonite, kaolin, bentonite, hallosite, dickite, nacrite and anauxite, alkoxysilanes as described, for example, in EP 0 102 544 B1, for example tetraalkoxysilanes such as tetramethoxysilane, tetraethoxysilane, tetrapropoxysilane, tetrabutoxysilane, or, for example, trialkoxysilanes such as trimethoxysilane, triethoxysilane, tripropoxysilane, tributoxysilane, alkoxytitanates, for example tetraalkoxytitanates such as tetramethoxytitanate, tetraethoxytitanate, tetrapropoxytitanate, tetrabutoxytitanate, or, for example, trialkoxytitanates such as trimethoxytitanate, triethoxytitanate, tripropoxytitanate, tributoxytitanate, alkoxyzirconates, for example tetraalkoxyzirconates such as tetramethoxyzirconate, tetraethoxyzirconate, tetrapropoxyzirconate, tetrabutoxyzirconate, or, for example, trialkoxyzirconates such as trimethoxyzirconate, triethoxyzirconate, tripropoxyzirconate, tributoxyzirconate, silica sols, amphiphilic substances and/or graphites. Particular preference is given to graphite.

As viscosity-increasing compound, it is, for example, also possible to use, if appropriate in addition to the abovementioned compounds, an organic compound and/or a hydrophilic polymer such as cellulose or a cellulose derivative such as methylcellulose and/or a polyacrylate and/or a polymethacrylate and/or a polyvinyl alcohol and/or a polyvinylpyrrolidone and/or a polyisobutene and/or a polytetrahydrofuran.

As pasting agent, it is possible to use, inter alia, preferably water or at least one alcohol such as a monoalcohol having from 1 to 4 carbon atoms, for example methanol, ethanol, n-propanol, isopropanol, 1-butanol, 2-butanol, 2-methyl-1-propanol or 2-methyl-2-propanol or a mixture of water and at least one of the alcohols mentioned or a polyhydric alcohol such as a glycol, preferably a water-miscible polyhydric alcohol, either alone or as a mixture with water and/or at least one of the monohydric alcohols mentioned.

Further additives which can be used for kneading and/or shaping are, inter alia, amines or amine derivatives such as tetraalkylammonium compounds or amino alcohols and carbonate-comprising compounds such as calcium carbonate. Such further additives are described, for instance, in EP 0 389 041 A1, EP 0 200 260 A1 or WO 95/19222.

The order of the additives such as template compound, binder, pasting agent, viscosity-increasing substance during shaping and kneading is in principle not critical.

In a further, preferred embodiment, the shaped body obtained by kneading and/or shaping is subjected to at least one drying step which is generally carried out at a temperature in the range from 25 to 300° C., preferably in the range from 50 to 300° C. and particularly preferably in the range from 100 to 300° C. It is likewise possible to carry out drying under reduced pressure or under a protective gas atmosphere or by spray drying.

In a particularly preferred embodiment, at least one of the compounds added as additives is at least partly removed from the shaped body during this drying process.

In addition to the porous metal-organic framework or mixture of porous metal-organic frameworks, the sorption medium can also comprise further sorbents which are not porous metal-organic frameworks.

It is thus possible for the sorption medium to be formed exclusively by porous metal-organic frameworks, i.e. at least one porous metal-organic framework.

Furthermore, the vacuum installation unit of the invention can comprise a sorption medium which comprises at least one further sorbent which is not a porous metal-organic framework.

Accordingly, the sorption medium can comprise a further sorbent or a mixture of various further sorbents, i.e. at least 2, 3, 4, 5, 6, 7 or 8 such sorbents which are not porous metal-organic frameworks.

Examples of at least one further sorbent are activated carbon or graphite, a molecular sieve, a zeolite, an alkali metal oxide, an alkaline earth metal oxide, an alkali metal hydroxide, an alkaline earth metal hydroxide, an alkali metal carbonate, an alkaline earth metal carbonate, an alkali metal sulfate, an alkaline earth metal sulfate or a metal which is capable of metal hydride formation at room temperature.

Suitable further sorbents are described, for example, in DE-A 199 29 396 or EP-A 0 930 475.

Preferred sorbents are accordingly microporous activated carbons, also referred to as microporous carbon molecular sieves, which preferably have an average pore diameter of from 0.4 to 4.1 nm, preferably from 0.7 to 2 nm and in particular from 1 to 1.6 nm. The frequency of the average pore diameter in the given ranges is more than 40%, preferably more than 50% and in particular more than 60%. The sorbents preferably comprise at least 86% by weight, preferably more than 95% by weight, based on the total weight, of carbon.

The microporous activated carbons preferably have an isotherm of type I.

The pore volume of the microporous activated carbons or microporous carbon molecular sieves is preferably in the range from 0.4 to 1.4 ml/g, preferably from 0.3 to 0.9 ml/g and in particular from 0.5 to 0.8 ml/g. The porosity of these microporous activated carbons or microporous carbon molecular sieves and thus the pore volume can be determined by means of a titration with, for example water by a method as described by A. Y Mottlau and N. E. Fischer in Anal. Chem. Vol 34 (6), pages 714-715 (1962).

If the pore volume of the microporous activated carbons or microporous carbon molecular sieves is determined from the change parallel to the abscissa of a gas sorption isotherm measured using nitrogen at 77 K, the average pore diameter can be calculated according to the BJH model (E. P. Barett, L. G. Joyner, P. P. Halenda, J. Amer. Chem. Soc., Vol. 73, 373-380 (1951)).

In the determination of the equivalent specific surface area by calculation according to the BET method (see Brunauer, P. H. Emmett, E. Teller in J. Amer. Chem. Soc. Vol. 60, pages 309 to 319 (1938), the microporous activated carbons or microporous carbon molecular sieves give values of preferably from 500 to 2500 m$^2$/g and above, preferably from 800 to 1700 m$^2$/g and in particular from 1000 to 1500 m$^2$/g. A further characteristic of the microporous activated carbons or microporous carbon molecular sieves can be the shape of the adsorption isotherms. In the gas adsorption measurements described in the prior art using nitrogen at a temperature of 77 K, the activated carbons or carbon molecular sieves which can be used according to the invention can have an isotherm whose shape is known as type I (K. S. W. Sind, D. M. Everett, R. A. W. Haul, L. Moscou, R. A. Pierotti, J. Rouquerol and T. Siemieniewska in Pure and Appl. Chem. Vol. 57 (4) pages 603 to 619 (1985)). No hysteresis loop occurs in the reversible type I isotherms.

The microporous activated carbons and microporous carbon molecular sieves are known and commercially available. Processes for producing them and their properties are described, for example, in Ullmanns Encyklopädie der technischen Chemie, volume 14, 4th revised and expanded edition, Verlag Chemie, Weinheim, N.Y., 1977, pages 620 ff, Ullmanns Encyclopedia of Industrial Chemistry, Vol. 5A, pages 124 ff, 5th edition, Verlag Chemie (1986), Kirk-Othmer, Encyclopedia of Chemical Technology, Vol. 4, pages 561 ff, 3rd edition, J. Wiley and Sons (1978), by G. C. Grunewald and R. S. Drago in J. Am. Chem. Soc. 1991, Vol. 113, pages 1636-1639, EP-B-0 102 902 and EP-B-0 119 924.

The microporous activated carbons and microporous carbon molecular sieves can be used individually or in the form of a mixture of at least two activated carbons, carbon molecular sieves or activated carbons and carbon molecular sieves having different specifications. Depending on the desired properties, it may be found to be advantageous to use mixtures of activated carbons and/or carbon molecular sieves which differ, for example, in the pore volume, the pore diameter and/or different water contents.

The microporous activated carbons and/or microporous carbon molecular sieves can be used in the commercial particle sizes. To achieve improved storage stability and easier handling of the system component comprising the microporous activated carbons and/or microporous carbon molecular sieves a), it is advantageous to use microporous activated carbons and/or microporous carbon molecular sieves having a particle size of from 0.5 to 200 mm, preferably from 3 to 40 mm and in particular from 5 to 10 mm.

The water content of the microporous activated carbons is generally in the range from 0.1 to 20% by weight, preferably in the range from 0.1 to 10% by weight.

Furthermore, it is possible to use all known dessicants. Preference is given to using alkali metal and alkaline earth metal oxides, hydroxides, carbonates and sulfates and also molecular sieves or zeolites and also silica gels. Particular preference is given to using sodium A zeolites, calcium oxide and barium oxide or mixtures of at least two of these compounds. The microporous activated carbons and/or microporous carbon molecular sieves are preferably used in combination with crystalline, microporous molecular sieves and/or amorphous, microporous silica gels.

Furthermore, it is possible to use CMS carbon molecular sieves, MPO's mesoporous oxide (silicates); MCM41 (aluminosilicates) (see "Kast", loc sit, page 20).

Crystalline, microporous molecular sieves having a diameter of the voids of less than 1.3 nm and composed of metal oxides or metal phosphates which are advantageously selected from the group of aluminum, boron, iron, chromium, vanadium, beryllium, antimony, arsenic, gallium, silicon, germanium, titanium, zirconium and hafnium oxides or phosphates are particularly suitable, so that such molecular sieves are preferably used. Molecular sieves suitable for this purpose can also be mixed oxides which consist essentially of aluminum-silicon oxide, boron-silicon oxide, iron(III)-silicon oxide, gallium-silicon oxide, chromium(III)-silicon oxide, beryllium-silicon oxide, vanadium-silicon oxide, antimony(V)-silicon oxide, arsenic(III)-silicon oxide, titanium (IV)-silicon oxide, aluminum-germanium oxide, boron-germanium oxide, aluminum-zirconium oxide and aluminum-hafnium oxide or exclusively of silicon dioxide (silicalites). Further suitable metal oxides are zeolites which have a diameter of the voids of from 0.74 to 0.41 nm and preferably have an $SiO_2/Al_2O_3$ ratio equal to or greater than 6. The zeolites can, for example, have a pentasil, faujasite, mordenite, erionite, chabasite, zeolithe A or offretite structure. As crystalline microporous molecular sieves, preference is given to using mordenite in the H form, Na form or ammonium form, offretite in the H form, K form, Na form or ammonium form, zeolites ZSM-5 in the H form, Na form or ammonium form, zeolite ZSM-11, zeolite ZSM-12, beta-zeolite, clinoptilolite, ferrierite, ultrastable Y zeolite, ultrastable mordenite or silicalites or, in particular, mordenite in the H or Na form or silicalites or mixtures of these molecular sieves in combination with the microporous activated carbons and/or carbon molecular sieves.

Suitable amorphous, microporous silica gels are those silicas gels which have a mean pore diameter which is in the range from 0.3 to 10 nm to an extent of more than 40%, a pore volume in the range from 0.15 to 1.8 ml/g and a BET surface area in the range from 200 to 900 $m^2/g$. The amorphous, microporous silica gels preferably have a chemical composition comprising at least 80% by weight, based on the total weight, of silicon dioxide. Apart from silicon dioxide, the chemical composition of the amorphous, microporous silica gels can additionally comprise oxides, e.g. oxides of aluminum, titanium, zirconium, magnesium, niobium, iron or zinc or at least two of these metal oxides.

Metals which are capable of forming metal hydrides to a sufficient extent in the temperature range up to 200° C. are also suitable. Noble metals, in particular palladium and platinum, or alloys of these metals can preferably be used.

The metals can be used as such, but are preferably used on supports. The metals are preferably immobilized on the microporous activated carbon. Immobilization can be effected, for example, by impregnating the substances mentioned with salts or oxides of the metals which can be used according to the invention and subsequently reducing these to the metal.

This can, in the case of palladium, be carried out, for example, by treating the activated carbon with the aqueous solution of a complex salt of divalent palladium, in particular a tetrammine-chloro complex of palladium. This treatment can preferably be effected by impregnating the activated carbon in a bath of this salt. To convert the palladium-comprising activated carbon into the hydrogen-adsorbing form, it is heated to temperatures up to 300° C. in the absence of air, resulting in the divalent palladium salt being reduced to metallic palladium. After such a treatment, the palladium is present in the form of immobilized clusters having a size of a few nanometers on the surface of the activated carbon. Treatment with other suitable metals is carried out in a similar way.

In a further advantageous embodiment, it is possible to use graphite comprising platinum and/or palladium and, if appropriate, water. Such substances are prepared by, for example, reducing hexachloroplatinic acid by means of formic acid in an aqueous graphite suspension. The amount of platinum on the support is preferably about 2% by weight, based on the support. The substance prepared in this way can be used either with water in the graphite framework or in dewatered form.

Furthermore, it is possible to use graphites in a nanofiber structure, as are described in Chem. and Eng. News, May 25, 1998. These graphites are able to incorporate hydrogen in the voids between the fibers.

The vacuum insulation units can be used in various forms, for example as rigid panels or else with other nonplanar geometries in flexible plastic pouches or steel coverings, for example in district heating pipes, and other fields of use. Their production and the materials which can be used are known per se. In general, a thermally insulating core material is sealed under reduced pressure together with the sorption medium in an envelope material having a low gas permeability in an airtight manner. In general, the vacuum in the vacuum insulation unit is less than 5 mbar, preferably less than 0.5 mbar, particularly preferably less than 0.1 mbar.

A film is generally used as envelope material for the vacuum insulation unit. Preferred films are composite films, in particular multilayer composite films having a vapor-deposited or laminated-on metal layer, for example a layer of aluminum. Suitable films comprise, for example, polyester, polyvinyl chloride, polyolefins such as polyethylene or polypropylene or polyvinyl alcohol. Inliners of refrigerators, pipe sheathing or metal layers are also possible as envelope material.

As core material for the vacuum insulation unit, it is possible to use various polymers or glass in the form of powders, granules, fibers or foams. Suitable polymers are, for example, polyurethanes, polyureas, polystyrenes, polyolefins, polyacrylates, phenolic resins or polyvinyl chloride. Preference is given to using open-cell foams composed of the abovementioned polymers, e.g. open-cell polystyrene foams or open-cell polyurethane foams, in particular open-cell rigid polyurethane foams, as core material.

However, it is also possible for the core material to consist of or comprise a porous metal-organic framework as described above. This can be used as powder or as shaped bodies.

The present invention therefore further provides a vacuum insulation unit in which the core material comprises a metal-organic framework.

The open-cell rigid polyurethane foams preferably have a proportion of open cells of from 50 to 100%. Their density is preferably from 30 to 100 kg/m$^3$, in particular from 50 to 65 kg/m$^3$. In general, they are obtained by reaction of suitable polyfunctional isocyanates and compounds having hydrogen atoms which are reactive toward isocyanates in the presence of cell openers. Examples of such cell openers are Tegostab B8919, Ortegol 501 from Goldschmidt or UAX 6164 from OSI.

A preferred process for producing vacuum insulation units, which are frequently in the form of panels, is described in WO-A 2006/120183.

A preferred process for producing a vacuum insulation unit according to the invention accordingly comprises enveloping a shaped body composed of open-cell foam in a gastight film and subsequently evacuating the film and heat-sealing it so as to be gastight, with the shaped body composed of open-cell foam being compressed after curing and before evacuation.

The vacuum insulation unit can be used as such for insulation purposes and in this case typically has the form of a panel, so that reference is also made to vacuum insulation panels in this context. However, the geometry of the vacuum insulation unit is not subject to any restrictions according to the present invention. The vacuum insulation units of the invention can also be part of a shaped body. The present invention therefore further provides a shaped body comprising a vacuum insulation unit according to the invention.

Preferred shaped bodies comprising a vacuum insulation unit are described, for example, in WO-A 2005/026605.

A preferred shaped body according to the invention is accordingly formed by a rigid compact polyurethane or a rigid polyurethane foam having a compact outer skin and a cellular core, with these comprising at least one vacuum insulation unit.

Such shaped bodies can, for example, be employed for the production of refrigerators, freezer chests, refrigerated vehicles, coolboxes, cooling cells or district heating pipes.

The present invention further provides for the use of a porous metal-organic framework as getter material or core material in a vacuum insulation unit, in particular a vacuum insulation unit according to the invention.

EXAMPLES

The absorption behavior of various conventional getter materials compared to a porous metal-organic framework derived from aluminum ions and terephthalic acid (MIL-53) was tested with the aid of GC-MS analysis. The concentration at which n-pentane, a main constituent of petroleum ether, could be detected in the gas phase served as indicator for the absorption limit. n-Pentane is a typical outgassing product which has an adverse effect on the stability of the vacuum.

| Getter material | Volume in µl/g of absorption medium |
|---|---|
| Zeolite 13 X | 9 |
| Activated carbon D45/2 | 45 |
| Calcium oxide | <0.5 |
| MIL-53 | 100 |

An increased absorption capability of the porous metal-organic framework compared to conventional getter materials is found.

The invention claimed is:

1. A vacuum insulation unit comprising at least one thermally insulating, evacuatable porous core material and at least one getter material, wherein said unit is sealed in an airtight manner and at least one of said at least one getter material consists of a porous metal-organic framework comprising at least one at least bidentate organic compound coordinated to at least one metal ion.

2. The vacuum insulation unit according to claim 1, wherein the at least one getter material is present in an amount of from 0.01 g to 50 g per liter of void volume of the vacuum insulation unit.

3. The vacuum insulation unit according to claim 1, wherein the at least one getter material comprises a mixture of a plurality of said porous metal-organic frameworks.

4. The vacuum insulation unit according to claim 1, wherein the porous metal-organic framework is present as shaped body.

5. The vacuum insulation unit according to claim 1, wherein the at least one metal ion is at least one ion selected from the group of metals consisting of Mg, Al, Y, Sc, Zr, Ti, V, Cr, Mo, Fe, Co, Cu, Ni, Zn and lanthanides.

6. The vacuum insulation unit according to claim 1, wherein the at least one at least bidentate organic compound is derived from a dicarboxylic, tricarboxylic or tetracarboxylic acid.

7. The vacuum insulation unit according to claim 1, further comprising at least one getter material which is not a porous metal-organic framework.

8. The vacuum insulation unit according to claim 7, wherein the at least one getter material which is not a porous metal-organic framework is at least one of an activated carbon or graphite, a molecular sieve, a zeolite, an alkali metal oxide, an alkaline earth metal oxide, an alkali metal hydroxide, an alkaline earth metal hydroxide, an alkali metal carbonate, an alkaline earth metal carbonate, an alkali metal sulfate, an alkaline earth metal sulfate and a metal capable of metal hydride formation at room temperature.

9. The vacuum insulation unit according to claim 1, wherein the core material comprises a metal-organic framework.

10. A shaped body comprising a vacuum insulation unit according to claim 1.

11. The vacuum insulation unit according to claim 1, wherein said core material is an open-cell rigid polyurethane foam.

12. The vacuum insulation unit according to claim 2, wherein said core material is an open-cell rigid polyurethane foam.

* * * * *